(12) United States Patent
Stachowiak

(10) Patent No.: US 8,394,502 B2
(45) Date of Patent: Mar. 12, 2013

(54) HIGHLY DURABLE FIRST SURFACE SILVER BASED OPTICAL COATINGS AND METHOD OF MAKING THE SAME

(75) Inventor: Grzegorz Stachowiak, Arvada, CO (US)

(73) Assignee: Ocean Thin Films, Inc., Largo, FL (US)

( * ) Notice: Subject to any disclaimer, the term of this patent is extended or adjusted under 35 U.S.C. 154(b) by 337 days.

(21) Appl. No.: 12/807,026

(22) Filed: Aug. 26, 2010

(65) Prior Publication Data

US 2011/0064967 A1    Mar. 17, 2011

Related U.S. Application Data

(60) Provisional application No. 61/276,623, filed on Sep. 14, 2009.

(51) Int. Cl.
    *B32B 15/04*   (2006.01)
    *B32B 15/08*   (2006.01)
(52) U.S. Cl. ........ 428/432; 428/434; 428/469; 428/689; 428/697; 428/699; 428/701; 428/702; 428/623
(58) Field of Classification Search .......................... None
    See application file for complete search history.

(56) References Cited

U.S. PATENT DOCUMENTS

| | | | |
|---|---|---|---|
| 3,682,528 A * | 8/1972 | Apfel et al. .................... | 359/360 |
| 3,712,980 A * | 1/1973 | Norton ........................... | 362/260 |
| 5,059,295 A * | 10/1991 | Finley ............................ | 204/192.27 |
| 6,128,126 A * | 10/2000 | Hohenegger et al. ......... | 359/360 |
| 6,771,870 B2 * | 8/2004 | Strobl et al. .................. | 385/133 |
| 2004/0028953 A1* | 2/2004 | Kraemling ..................... | 428/698 |
| 2004/0047057 A1* | 3/2004 | Pouteau et al. ................ | 359/883 |
| 2007/0223096 A1* | 9/2007 | O'Connor et al. ............. | 359/584 |
| 2008/0068704 A1* | 3/2008 | Schmidt et al. ............... | 359/360 |

FOREIGN PATENT DOCUMENTS

DE    19903816 A1 *   8/2000

\* cited by examiner

*Primary Examiner* — David Sample
(74) *Attorney, Agent, or Firm* — Dennis L. Cook, Esq.

(57) ABSTRACT

A highly durable, environmentally and thermally stable Silver coating for mirrors, Infrared thin-film filters, or other optical coatings having very high reflection values over a large spectral and angular range where the enhanced durability and thermal stability are achieved through the selection and layer sequence of materials, which provide good chemical and environmental protection to Silver. Of particular importance are the layers directly below the Silver, and directly above the Silver (nucleation layer and barrier layer). It is important that the materials of those two layers provide diffusion barriers for Oxygen, water vapour and other corrosive gases, and are compatible in such a way that the layer below the Silver provides a good nucleation bed for Silver assuring that Silver will grow dense and highly reflective, and in some cases, when deposited in very thin layers, highly transparent in the visible spectrum, and the material of the layer directly above the Silver layer has to be compatible with Silver in a sense that it grows dense on the top of Silver, does not reduce the reflectivity of Silver, and also provides a good nucleation layer for the next layer being deposited.

6 Claims, No Drawings

HIGHLY DURABLE FIRST SURFACE SILVER BASED OPTICAL COATINGS AND METHOD OF MAKING THE SAME

CROSS-REFERENCE TO RELATED APPLICATION

The present application claims the benefit of previously filed Provisional Patent Application, U.S. Ser. No. 61/276,623.

FIELD OF THE INVENTION

The present invention relates, in general, to a highly durable high-reflection (highly reflective) Silver coatings and more specifically, to an environmentally stable thin-film Silver containing mirrors having very high reflection values over a wide spectral (visible and IR) and incident angular range, Infrared (IR) optical filters (Heat filters) having high transmittance in the visible spectrum, and very high reflectance in the Infrared region, and other Silver based optical coatings such as Neutral Beam Splitters and Narrow Band-pass Filters.

BACKGROUND OF THE INVENTION

There is growing interest in first surface Enhanced Silver Mirrors, coatings on glass, Aluminium, Nickel, plastics, and possible other substrates. Silver has excellent reflectance in the visible and infrared spectral regions. Very thin Silver layers with adequate antireflective layers have unique characteristics of high reflectivity in the IR region and high transmittance (low reflectivity) in the visible region, which is desired for Heat Filters. Broad use of Silver coatings has been limited because of the poor mechanical, environmental and thermal durability of this material. The largest potential for Silver mirrors is in the Solar Energy industry. There is also a need for high reflectance coatings in the lighting industry, particularly for stage reflectors. Similarly, there is need for high performance IR Filters (Heat Filters) that are highly reflective from about 750 nm to 50 µm and above, and highly transparent in the visible spectrum from about 400 nm to about 700-750 nm. However Silver based coatings have serious durability and heat resistance problems resulting from outdoor climate in the case of Solar applications, and high operating temperature in the case of high power reflectors and heat filters. This novel, highly durable, and heat resistant Silver coating was designed to overcome some of the drawbacks in using Silver as a mirror or heat filter coating while retaining it's unique reflective characteristics.

Silver is a material with excellent optical properties. The use of Silver as an optical thin-film material is extensively described for example in the publication "Thin-film Optical Filters", H. A. Macleod, Adam Hilger Ltd., Second Edition. Unfortunately, Silver has poor environmental and thermal compatibility, since it is, on the one hand, relatively soft and consequently can readily be mechanically damaged and, on the other hand, an impairment of optical properties occurs due to (chemical degradation) corrosion if the Silver is exposed without protection against the environment, a variety of chemicals, or elevated temperatures.

For this reason Silver layers are frequently interleaved in layered systems where the material selected for the remaining layers is determined by the desired optical properties, such as spectral properties, and also by the necessity of increasing the resistance of the Silver layer to environmental and mechanical degradation.

Oxides, Zinc Sulfide, Nitrides, Fluorides, or metals are frequently used in order to protect Silver in optical thin films. In particular, oxides are used due to their optical properties, their resistance to environmental factors, and also because of their hardness. Applying the oxide layer, however, can cause a degradation of the Silver. Much of the prior art has disclosed attempts to avoid this problem.

For example DR-OS-33 07 661 suggests first covering the silver layer with a further metal layer comprising aluminum, titanium, tantalum, chromium, manganese or zirconium, onto which further metal layers; and lastly an oxide layer is disposed, comprising indium oxide, tin oxide or a mixed oxide thereof. DE-OS-35 43 178 suggests a multilayer covering wherein the silver layer, in turn, is covered by a further metal layer comprising tantalum, tungsten, nickel or iron, which further metal layer, in turn, is covered by an oxide layer, wherein SnO, $SiO_2$, $Al_2O_3$, $Ta_2O_5$ or $ZrO_2$ are suggested as the oxide layers. Similarly U.S. Pat. No. 3,682,528 suggests covering the silver layer with a thin nickel layer, if any further layers are to be applied. According to an alternative embodiment, DE 33 27 256 suggests applying at least one hypostoichiometric oxide layer on the silver, comprising, for example, titanium oxide or titanium nitride or a mixture thereof. DE-A-33 29 504 further suggests covering the silver layer with a dielectric layer wherein the material composition in the region of the transition areas, changes gradually and continuously. Titanium oxide is mentioned; for example, as such a dielectric layer.

U.S. Pat. No. 5,510,173 describes substantially transparent copper and silver plus noble metal coatings. These coating's ability to withstand corrosive environments is improved by over-coating the metal layers with a double coating of dielectric. The first coating is made up of a dielectric based on indium and/or zinc, the second coating is made up of a dielectric based on indium and tin.

An environmentally stable silver containing mirror having very high reflection values over a large spectral range is disclosed in U.S. Pat. Nos. 6,275,332 and 6,128,126 which comprises a silver containing layer disposed on a substrate, which is covered by a zinc sulfide layer. To keep the sulfur from being set free during the application, or during the vaporization of the zinc sulfide, and attacking the silver, at least one barrier or intermediate layer is placed between the silver containing layer and the zinc sulfide layer.

U.S. Pat. No. 6,839,176 describes a process that starts with a standard substrate cleaning preparation with an abrasive or chemical cleaning method. The substrate is then transferred to a vacuum coating chamber. The substrate is then exposed to an Argon rich ion stream to further prepare the surface. Next a medium index material, or mixture of materials having a combined medium refractive index, is deposed on the surface with Argon ion bombardment. The Silver is then deposited until it is maximally reflective. A second deposition of the medium index material, or mixture of materials having a combined medium refractive index, is then done, also with the Argon ion bombardment. The second medium index material, or mixture, coating is then followed with a standard ion assisted optical film deposition to maximize reflection at the desired wavelength and angle of incidence.

The highly durable Silver coating for a mirror or IR thin-film optical filter of this invention exhibits better durability and, particularly, greater resistance to elevated temperatures than the prior art while still maintaining high reflectivity in IR and visible regions, or high reflectivity in IR and high transparency in visible spectrum as needed for particular application. For example the prior art's use of Zinc Sulfide is an undesired material for use in Silver based coatings as, in the presence of humidity, it may release chemicals corrosive to Silver such as H2S. Zinc Sulfide and some oxides such as ZnO, SnO are not very durable, consequently, coatings containing those material have low environmental durability.

Resistance of Silver based coating to elevated temperatures requires separate considerations. Some materials such as Zinc Sulfide decompose at temperatures exciding 400 C, particularly if moisture is present. Most oxides listed in the prior art may cause oxidation of Silver at elevated temperatures. Most typically, such oxidation is caused by the free oxygen trapped in the coating during reactive or semi-reactive deposition. At elevated temperatures such Oxygen diffuses through the layers and may easily reach and oxidize the surface of the Silver layer causing loss of reflectivity and de-lamination of layers. Typically oxides, such as $TiO_2$, $Ta_2O_5$, $Nb_2O_5$, are deposited reactively or at least in presence of Oxygen (semi-reactively), leading to the process described above. Particularly damaging is if such oxides are deposited below the Silver layer (between the substrate and the Silver layer).

SUMMARY OF THE INVENTION

The durability of known Silver based coatings is generally insufficient for outdoor or high temperature applications (high power reflector, heat filters). More durable enhanced Aluminium coatings or second surface Silver coatings have, in turn, lower than desired reflectance for Solar and, in some cases, reflector applications. In the case of IR filters, sufficient transparency in the visible range cannot be achieved with Al and other materials. This invention provides an improved solution to the above problems. The disclosed First Surface Enhanced Silver Coating has high reflectance in the visible and IR spectral regions, generally about 98%. Enhancements can be designed to increase reflectance in the desired spectral region (at the expense of other regions). For example, samples were coated resulting in reflectance in the visible of about 99% average, with other samples resulting in reflectance exceeding 98% in the IR (and visible). Silver based IR thin-film filters using similar materials and layer structure are also disclosed.

The enhanced durability was achieved through the selection and layer sequence of materials, which provide good chemical and environmental protection to Silver. Of particular importance are the layers directly below the Silver, and directly above the Silver (nucleation layer and barrier layer). It is important that the materials of those two layers are compatible in such a way that the layer below the Silver provides a good nucleation bed for Silver assuring that Silver will grow dense and highly reflective, and the material of the layer directly above the Silver layer has to be compatible with Silver in a sense that it grows dense on the top of Silver, does not reduce the reflectivity of Silver, and also provides a good nucleation layer for the next layer being deposited. Both barrier layers must also efficiently block diffusion of Oxygen, water vapour and other corrosive chemicals towards the Silver layers, at low as well as high temperatures. It is also critical that the barrier and other layers close to the Silver will not become sources of Oxygen at high temperatures, either releasing trapped Oxygen, causing decomposition of trapped water vapour, or partially decomposing realising Oxygen or other corrosive gases.

For achieving very high reflectance in the case of first surface mirrors, the top barrier must be virtually non-absorbing. In the case of IR filters, both barriers should be non-absorbing in the visible region, and at least the top barrier should be transparent in the IR region.

It is therefore clear that a primary object of this invention is to advance the art of high durability and heat resistance of Silver based coatings for thin-film mirrors, filters, and other optical coatings. A more specific object is to advance said art by providing the composition of highly durable Silver coating for mirrors and thin-film IR filters resulting in an environmentally and thermally stable Silver containing mirror having very high reflection values over a wide spectral range, and IR filters having very high transmittance in the visible, and very high reflectance in the IR spectral regions, or spectral performance needed in other optical coatings.

These and other important objects, features, and advantages of the invention will become apparent as this description proceeds. The invention accordingly comprises the features of construction, combination of elements, arrangement of parts, and significant deposition process considerations that will be exemplified in the construction hereinafter set forth, and the scope of the invention will be indicated in the claims.

DESCRIPTION OF THE PREFERRED EMBODIMENTS

It is therefore beneficial to design an enhanced Silver mirror or thin-film IR-filter that can retain Silver's high reflectance characteristics while remaining stable and durable in various environments, including high temperatures.

The enhanced durability was achieved through the selection and layer sequence of the materials, which provide good chemical and environmental protection to Silver. Of particular importance are the layers directly below the Silver, and directly above the Silver (nucleation layer and barrier layer respectively). It is important that materials of those two layers are compatible in such a way that the layer below the Silver provides a good nucleation bed for the Silver assuring that the Silver will grow dense and highly reflective, and the material of the layer directly above the Silver layer has to be compatible with the Silver in a sense that it grows dense on the top of the Silver, does not reduce the reflectivity of the Silver, and also provides a good nucleation layer for the next layer being deposited. Both layers must be also efficient diffusion barriers for Oxygen and other corrosive gases.

Also of importance is protecting the Silver from oxidation during the deposition of the coating and later in applications, because once oxidized a Silver surface becomes less reflective and does not adhere to other materials, leading to disintegration of the thin film coating. Therefore the deposition method, as well as layer structure and materials, have to be selected and designed such that the Silver is protected from Oxygen and water vapours at all times. All the layers' materials and deposition methods have to be selected or designed such that the layers themselves would not become sources of Oxygen or other corrosive gases, which may happen at elevated deposition temperatures. The closer the layer is to the Silver layer, the more critical is the above consideration. Also, layers below the Silver layer are in that sense more critical than the layers above the Silver layers. For example, most oxides, such as $TiO_2$, $Nb_2O_5$, $Ta_2O_5$, ZnO, are either deposited reactively or in presence of oxygen to eliminate residual absorption. Inevitably, free Oxygen is trapped in such layers (typically several atomic %). Deposition should be done at low temperature because at elevated temperatures this oxygen will diffuse out of that layer and through other layers, eventually reaching and damaging the Silver layer. Similarly, materials such as ZnS may release Sulphur based chemicals, such as $H_2S$, that are corrosive to Silver.

Based on professional knowledge and experimentation, it has been determined that excellent materials for the layer directly below the Silver are metals such as Chromium, Titanium, Niobium, Zirconium, Molybdenum and their Nitrides, noble metals such as Palladium, alloys such as NiCr, and oxides such as partially oxidized Titanium (TiOx, $0<x<2$) or Zinc Oxide ZnO and $YF_3$. $YF_3$ is particularly suitable for applications where visible transmittance is required, examples are IR and Band Filters, and Beam Splitters. In these experiments a vacuum deposition technique, more specifically, E-beam Evaporation and Plasma Assisted E-beam Evaporation were used. Similar results may be achieved using Resistance Evaporation, or combination of Resistance and E-beam evaporation, with or without Plasma Assistance or Ion Assistance. A combination of Sputter Deposition or Chemical Vapor Deposition (CVD) with one or both Evaporation techniques could be also used. Sputter Deposition must be combined with Evaporation in order to deposit Fluorides, which cannot be deposited with Sputtering.

For the barrier layer directly over the Silver it has been determined that low refractive index Fluorides ($YF_3$, $MgF_2$), and combinations such as Ag\$YF_3$\$MgF_2$\ provides the best combination of properties, excellent chemical protection and high transparency. $AlF_3$ can be substituted for $MgF_2$ but the combination of a thin $YF_3$ followed by a thick $MgF_2$ layer has been determined as optimum for performance and cost of materials for the mirrors, while in case of IR Filter and other coatings, a combination of relatively thin $YF_3$ followed by high index material may be better for spectral performance reasons. It has been determined that optimum materials for such high index layers are refractory Nitrides such as SiNx and SiZrNx, and refractory oxide which may be deposited fully transparent without introducing oxygen in the deposition chamber, such as $ZrO_2$, $Y_2O_3$, $Al_2O_3$, or deposited at very low rate $TiO_2$, $Nb_2O_5$ and $Ta_2O_5$. Typically used barrier materials NiCr and NiCrNx were rejected as they reduce the reflectivity of the Silver, and/or transmittance of a very thin Silver layer. To complete the enhancement of the Silver reflector high refractive index material such as $TiO_2$, $Nb_2O_5$, $Ta_2O_5$, $ZrO_2$, and $HfO_2$ should be used over low index materials. Other layers and materials may be used below the nucleation layer or above the protective Fluoride layer. Those layers may in some cases enhance performance of the film, but do not change the essence of this invention.

The addition of a fraction of a percent to several percent of Gold or Palladium to the Silver is possible for the further improvement of environmental, chemical and thermal durability of the disclosed enhanced Silver based coatings.

In the single enhancement and double enhancement preferred embodiments the complete E-Ag coating may have the following layer/material sequences:
Silver with Single Enhancement:
Substrate; /10 nm Ti/150 nm Ag/5 nm $YF_3$/85 nm $MgF_2$/59 nm $TiO_2$; or,
Substrate; /10 nm Cr/150 nm Ag/5 nm $YF_3$/85 nm $MgF_2$/59 nm $TiO_2$; or,
Substrate; /50 nm TiOx/10 nm Ti/150 nm Ag/5 nm $YF_3$/85 nm $MgF_2$/59 nm $TiO_2$.
Silver with Double Enhancement:
Substrate; /10 nm Ti/150 nm Ag/5 nm $YF_3$/85 nm $MgF_2$/59 nm $TiO_2$/90 nm $MgF_2$/59 nm $TiO_2$.

Other multilayer enhancements starting with low index material and ending with high index or low index material are also possible without changing the essence of this invention.

In the case of IR filters, which have to be highly transparent in the visible spectrum and highly reflective in the IR region, materials, the number of layers, and their structure have to be changed, but the same concept of protective layers directly under and over the Silver layer applies. The thickness of the Silver layer (or layers) has to be greatly reduced compared to the reflective stacks. Generally, the thickness of a Silver layer in IR filters needs to be under 20 nm depending on the required transmittance level. For transmittance exceeding 80%, Silver layers are typically 8-15 nm thick.

Since high visible transmittance is desired, the best barrier layers are non-absorbing. That requires change or elimination of the all absorbing or partially absorbing layers. Two barrier structures have been evaluated with excellent results. The first with 5 nm $YF_3$ for both barriers, and the second with 2 nm, deposited slowly and without introducing Oxygen into the deposition chamber, Ti for the barrier directly under the Silver layer, and 5 nm $YF_3$ directly over the Silver layer. In the experiment the very thin Ti layer was largely oxidized in the deposition process, so the resulting under-layer ended as TiOx, $0<x<2$. Both structures worked well and had excellent adhesion and transmittance.

Preferred embodiment film structures for the IR filter are as follows:
(HL layers) 2 nm Ti or TiOx/8-20 nm Ag/5 nm $YF_3$ (HL layers); or,
(HL layers) 5 nm $YF_3$/8-20 nm Ag/5 nm $YF_3$ (HL layers);
where HL stands for alternating layers of low and high index materials such as $SiO_2$, $MgF_2$ or $YF_3$ (L) and ZrO, $ZrO_2$, SiNx, SiZrNx, $TiO_2$, $Nb_2O_5$ or $Ta_2O_5$ (H). Use of other high index materials including ZnS is also possible. For the best thermal stability of the Silver based multilayer thin film all oxides should be deposited without introducing Oxygen to the deposition chamber.

There are advantages regarding spectral performance using multiple Ag layer structures (so called double Silver, triple Silver and so on). Example layer structures are as follows:
(HL layers) 5 nm $YF_3$/8-20 nm Ag/5 nm $YF_3$ (H or L spacer) 5 nm $YF_3$/12-15 nm Ag/5 nm $YF_3$ (HL layers);
(HL layers) 2 nm Ti or TiOx/12-15 nm Ag/5 nm $YF_3$ (H or L spacer) 2 nm Ti or TiOx/12-15 nm Ag/5 nm $YF_3$ (HL layers); or,
(HL layers) 2 nm Ti or TiOx/12-15 nm Ag/5 nm $YF_3$ (H or L spacer) 5 nm $YF_3$/12-15 nm Ag/5 nm $YF_3$ (HL layers).

It will thus be seen that the objects set forth above, and those made apparent from the foregoing description, are efficiently attained. Since certain changes may be made in the foregoing construction without departing from the scope of the invention, it is intended that all matters contained in the foregoing construction or shown in any accompanying drawings shall be interpreted as illustrative and not in a limiting sense.

What is claimed is:
1. A coated article comprising a vacuum deposited layer system supported by a glass, metal, ceramic or plastic substrate having a nucleation layer below a Silver layer comprising:
   a vacuum deposited nucleation layer comprising $YF_3$; and,
   a vacuum deposited Silver layer above said $YF_3$ comprising layer.
2. A coated article comprising a vacuum deposited layer system supported by a glass, metal, ceramic or plastic substrate having a nucleation layer below a Silver layer and a barrier layer above the Silver layer comprising:
   a vacuum deposited nucleation layer comprising $YF_3$;
   a vacuum deposited Silver layer; and,
   a vacuum deposited barrier layer comprising $YF_3$ or $MgF_2$.
3. The coated article of claim 2 wherein said vacuum deposited barrier layer is a $YF_3$ comprising layer and further comprising at least one $MgF_2$ and/or $AlF_3$, $TiO_2$, $Nb_2O_5$, $Ta_2O5$, $ZrO_2$, or $HfO_2$ comprising layer above said barrier layer $YF_3$ comprising layer.

4. The coated article of claim 3 wherein said $MgF_2$ and/or $AlF_3$, $TiO_2$, $Nb_2O_5$, $Ta_2O5$, $ZrO_2$, or $HfO_2$ comprising layer is directly above and adjacent to said barrier layer $YF_3$ comprising layer.

5. The coated article of claim 2 comprising a vacuum deposited nucleation layer comprising $YF_3$, and having one or more of the metals Titanium, Niobium, Zirconium, Molybdenum, Chromium, alloys such as NiCr, and/or their Nitrides, Oxides, sub-Oxides or alloys, noble metals, and/or $MgF2$ comprising layer below said nucleation layer.

6. The coated article of claim 2 further comprising multiple additional Silver layers deposited above said vacuum deposited barrier layer comprising $YF_3$ or $MgF_2$ with spacer layers between said additional Silver layers, said spacer layers further comprising $YF_3$, or $YF_3/MgF_2/YF_3$, or $YF_3/AlF_3/YF_3$.

* * * * *